US011568075B2

(12) United States Patent
Boding et al.

(10) Patent No.: US 11,568,075 B2
(45) Date of Patent: Jan. 31, 2023

(54) AUTO-TUNING OF RULE WEIGHTS IN PROFILES

(71) Applicant: Visa International Service Association, San Francisco, CA (US)

(72) Inventors: Benjamin Scott Boding, Mountain View, CA (US); Ge Wen, Fremont, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 250 days.

(21) Appl. No.: 16/926,535

(22) Filed: Jul. 10, 2020

(65) Prior Publication Data

US 2022/0012352 A1  Jan. 13, 2022

(51) Int. Cl.
*H04L 9/40* (2022.01)
*G06F 21/31* (2013.01)
*G06F 21/60* (2013.01)
*G06F 21/62* (2013.01)
*G06N 5/02* (2006.01)
*G06N 20/00* (2019.01)

(52) U.S. Cl.
CPC ......... *G06F 21/6218* (2013.01); *G06N 5/025* (2013.01); *G06N 20/00* (2019.01)

(58) Field of Classification Search
CPC . H04L 63/0861; H04L 63/10; G06F 21/6218; G06F 21/316; G06F 21/604; G06N 5/003; G06N 5/025; G06N 20/00; G06N 20/20; G06N 3/0427
See application file for complete search history.

(56) References Cited

U.S. PATENT DOCUMENTS

| 8,645,250 | B2 | 2/2014 | Boding |
| 9,760,861 | B2 | 9/2017 | Boding |
| 2012/0231802 | A1 | 9/2012 | Ngai |

(Continued)

FOREIGN PATENT DOCUMENTS

CN          106506454 A  *  3/2017

OTHER PUBLICATIONS

Application No. PCT/US2021/040950, International Search Report and Written Opinion, dated Oct. 26, 2021, 9 pages.

*Primary Examiner* — Joseph P Hirl
*Assistant Examiner* — Aayush Aryal
(74) *Attorney, Agent, or Firm* — Kilpatrick Townsend & Stockton LLP

(57) ABSTRACT

Disclosed is a system to optimize rule weights for classifying access requests so as to manage rates of false positives and false negative classifications. A rules suggestion engine may suggest a profile of classification rules to a merchant for access requests. The system can optimize weights for the profile of rules using a cost function based on a training set of historical access requests, for example using stepwise regression or machine learning (ML). The system can compute a profile score based on the optimized weights, for example by summing the weights. The system statistically analyzes the profile score using classification thresholds and the historical access requests. The system can perform receiver operating characteristic (ROC) analysis for various threshold values, enabling a user to select a suitable threshold. The system can further optimize by adding or removing rules from the profile of rules.

16 Claims, 13 Drawing Sheets

(56) References Cited

U.S. PATENT DOCUMENTS

| | | | |
|---|---|---|---|
| 2016/0028776 A1* | 1/2016 | Lim | G06F 16/958 |
| | | | 726/1 |
| 2018/0288063 A1* | 10/2018 | Koottayi | H04L 63/1416 |
| 2019/0244147 A1 | 8/2019 | Singh et al. | |
| 2019/0387014 A1* | 12/2019 | Zhou | G06Q 20/3224 |
| 2020/0053090 A1* | 2/2020 | Kliger | G06F 21/604 |
| 2020/0175388 A1 | 6/2020 | Hu | |
| 2020/0372510 A1* | 11/2020 | Baruvoori | G06Q 20/4012 |
| 2021/0409374 A1* | 12/2021 | Boding | H04L 63/101 |

\* cited by examiner

Figure 2B:
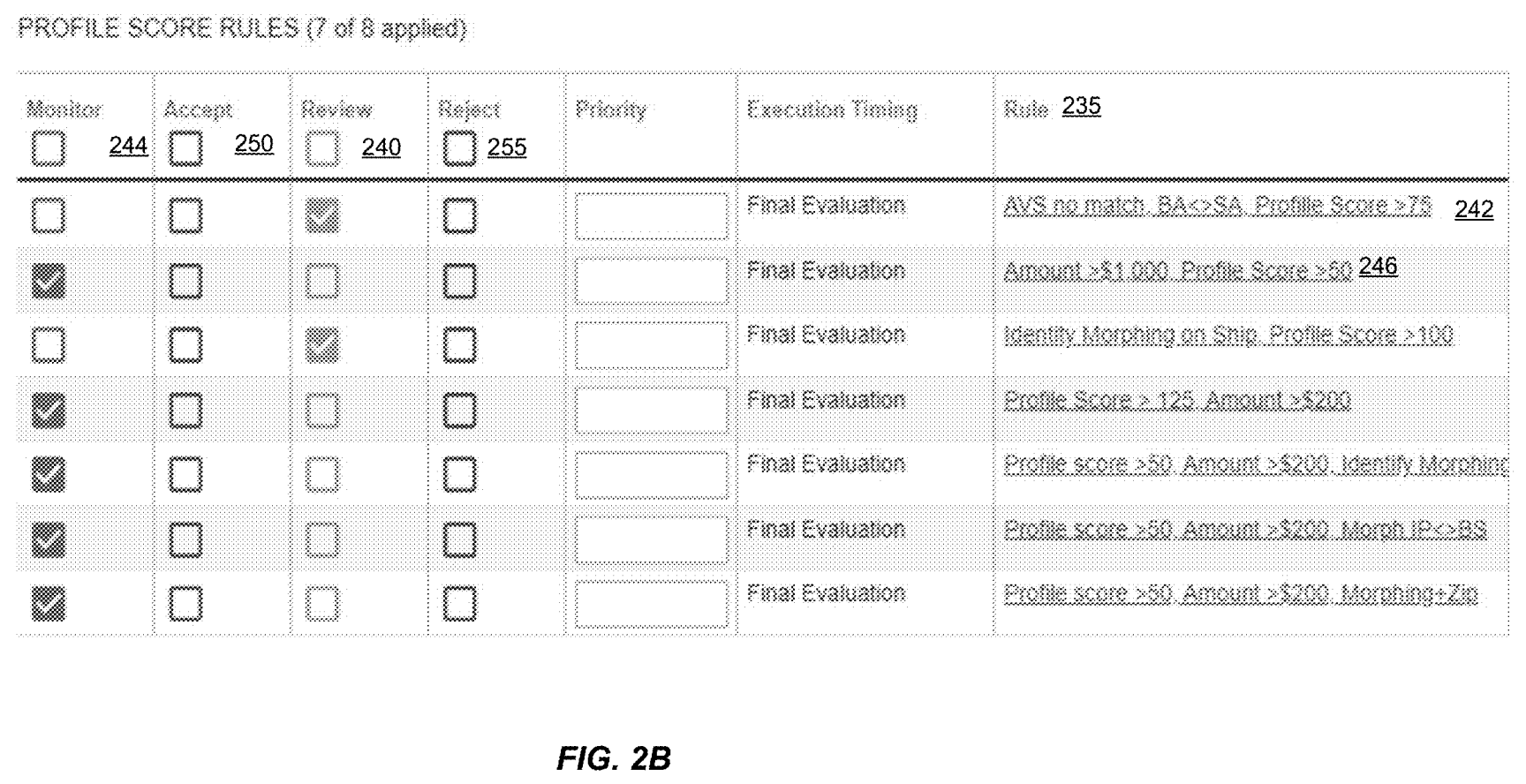

PROFILE SCORE RULES (7 of 8 applied)

| Monitor 244 | Accept 250 | Review 240 | Reject 255 | Priority | Execution Timing | Rule 235 |
|---|---|---|---|---|---|---|
| ☐ | ☐ | ☐ | ☐ | ☐ | | |
| ☐ | ☐ | ☐ | ☐ | ☐ | Final Evaluation | AVS no match, BA:>SA, Profile Score >75 242 |
| ■ | ☐ | ☐ | ☐ | ☐ | Final Evaluation | Amount >$1,000, Profile Score >50 246 |
| ☐ | ☐ | ■ | ☐ | ☐ | Final Evaluation | Identify Mapping on Site, Profile Score >100 |
| ■ | ☐ | ☐ | ☐ | ☐ | Final Evaluation | Profile Score >125, Amount >$200 |
| ■ | ☐ | ☐ | ☐ | ☐ | Final Evaluation | Profile Score >50, Amount >$200, Identify Mapping |
| ■ | ☐ | ☐ | ☐ | ☐ | Final Evaluation | Profile Score >50, Amount >$500, Month-PC >35 |
| ■ | ☐ | ☐ | ☐ | ☐ | Final Evaluation | Profile Score >50, Amount >$500, Month-PC >35, Month+78 |

| Rules 265 | Point Value in the Standard Profile 270 | Rule Action 275 |
|---|---|---|
| .edu, .mil, .gov, .org | -50 | Monitor |
| Browser Language Anomaly 280 | 15 | Monitor |
| Browser Session Anomaly 285 | 15 | Monitor |
| Browser String Anomaly | 15 | Monitor |
| Cookies Disabled 290 | 15 | Monitor |
| Device Confirmed Risky | 15 | Monitor |
| Flash & Images Disabled, Risky Device Char, Unveri | 25 | Monitor |
| Image Anomaly | 10 | Monitor |
| IP Address from Anonymous Proxy | 25 | Monitor |
| IP Address from Risky Source | 25 | Monitor |
| IP Inconsistent with Billing State | 25 | Monitor |
| JavaScript Disabled | 25 | Monitor |
| Language Anomaly | 15 | Monitor |
| New Device | 10 | Monitor |
| Operating System Anomaly | 15 | Monitor |
| Risky Device Characteristics | 5 | Monitor |
| Risky Email Domain - by AFS Score | 25 | Monitor |
| Risky Local Time of Billing Address | 25 | Monitor |
| Screen Aspect Ratio Anomaly | 25 | Monitor |
| Screen Resolution Anomaly | 25 | Monitor |
| Suspicious True IP Address Activities | 25 | Monitor |
| Suspicious True IP Address Attributes | 25 | Monitor |
| Time Zone Offset Anomaly | 25 | Monitor |
| Unverifiable Address | 25 | Monitor |

*FIG. 2C*

| Significance | Rule Number | Coefficients | Importance Index |
|---|---|---|---|
| 1 | NRule480 | 1.32 | 33% |
| 2 | NRule353 | 3.94 | 100% |
| 3 | VAR1 | 0.05 | 1% |
| 4 | NRule165 | 3.57 | 91% |
| 5 | NRule471 | 1.24 | 31% |
| 6 | VAR2 | 0.0005 | 0% |
| 7 | NRule64 | 3.09 | 78% |
| 8 | NRule139 | 2.50 | 63% |
| 9 | NRule169 | -0.63 | -16% |
| 10 | NRule207 | 2.73 | 69% |
| 11 | NRule475 | -1.92 | -49% |
| 12 | NRule469 | 1.04 | 26% |
| 13 | NRule286 | 2.13 | 54% |
| 14 | NRule467 | -0.93 | -24% |
| 15 | NRule306 | 0.76 | 19% |
| 16 | NRule464 | 1.14 | 29% |
| 17 | NRule377 | 2.06 | 52% |
| 18 | NRule259 | -2.59 | -66% |
| 19 | NRule319 | 3.51 | 89% |
| 20 | NRule322 | 1.57 | 40% |
| 21 | NRule441 | 3.48 | 88% |
| 22 | NRule367 | 0.42 | 11% |
| 23 | NRule158 | 1.55 | 39% |
| 24 | NRule302 | -2.91 | -74% |

*FIG. 5*

AUTO-TUNING OF RULE WEIGHTS IN PROFILES

BACKGROUND

Resource providers may generate rules that are applied to access requests. The rules can, for example, prevent fraudulent access from occurring. Over time, the resource provider may generate hundreds or thousands of rules. For example, a rule can be generated for each type of fraudulent access request.

A rules suggestion engine may suggest a profile of rules to a user for recognizing fraudulent access requests. A classification system can use the rules to classify access requests, for example by forming a profile score based on weights associated with the rules.

Typically, users may assign the weights manually, based on knowledge and experience. Users may often guess at suitable values for the weights, which can lead to inaccurate results, e.g. false negative or false positive classifications. Accordingly, there is a need to optimize the weights automatically for each rule, and/or to optimize a profile score automatically for the rules, so as to improve accuracy, ease of use, and consistency of classification.

BRIEF SUMMARY

A rules suggestion engine can suggest a profile of classification rules to a merchant for access requests. The rules can be used collectively to determine a profile score in order to make an access decision for the access requests. Weights for rules in the rule profile can be optimized using a cost function based on a training set of historical access requests. The disclosed system can considerably improve the classification accuracy using the rules (for example, by optimizing a probability of correct ranking).

In an embodiment, an access system can receive a set of historical access requests for a set of resources. Each of the set of historical access requests can comprise access data identifying a resource of the set of resources and including requestor information of a requesting entity and an outcome label regarding a validity of the access request. The system can receive a rule profile comprising rules that are triggerable by the access data. The rule profile can define a profile score based on weights of rules that are triggered for an access request and can specify access classifications of providing access to the set of resources managed by a resource computer based on the profile score.

The system can optimize, using the set of historical access requests, the weights for the rules of the rule profile using a cost function that includes the access classifications of the set of historical access requests obtained using the weights. The cost function can include penalties for false positive classifications and false negative classifications relative to the outcome labels. The system can receive one or more classification thresholds for the rule profile from the resource computer or use a default threshold or other values determined internal to the access system.

The system can receive a current access request including new access data identifying a current resource and including current requestor information of a current requesting entity. The system can compute a current profile score for the rule profile based on the optimized weights. The system can use the one or more classification thresholds to determine a current access classification for providing access to the current resource. The system can process the current access request in accordance with the current access classification to provide a specified access to the current resource.

Other embodiments are directed to systems, devices, and computer readable media associated with the methods described herein.

A better understanding of the nature and advantages of exemplary embodiments may be gained with reference to the following detailed description and the accompanying drawings.

BRIEF DESCRIPTION OF THE DRAWINGS

FIG. 2B shows an example presentation of a profile score for a rules profile, in accordance with an embodiment.

FIG. 2C shows example rule actions, in accordance with an embodiment.

FIG. 5 shows example optimized rule weights, in accordance with embodiments of the present disclosure.

TERMS

Figure 1A:
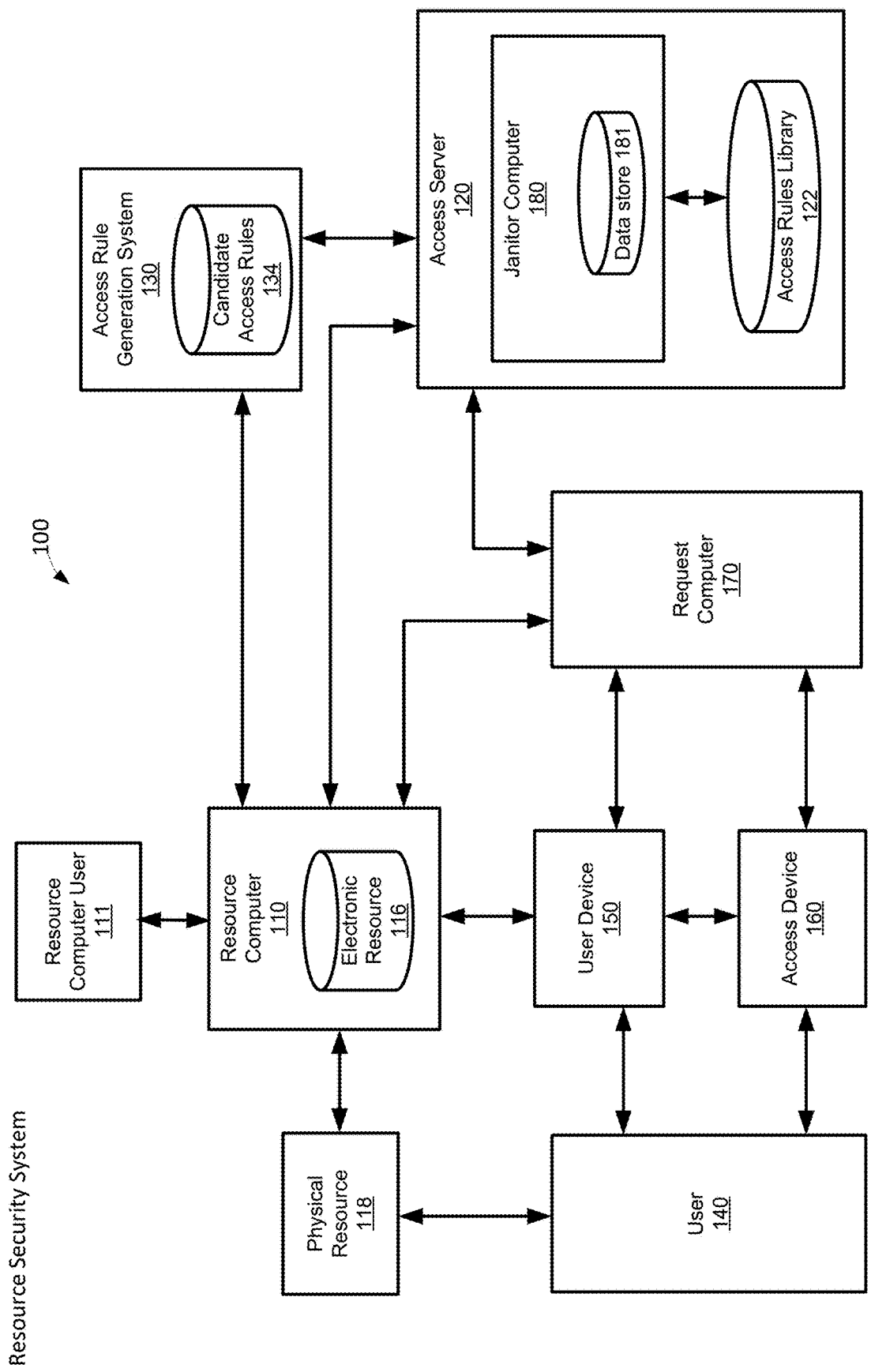
FIG. 1A shows a resource security system for authorizing access to resources, in accordance with some example embodiments.

Prior to discussing embodiments of this disclosure, description of some terms may be helpful in understanding the embodiments.

A "resource" generally refers to any asset that may be used or consumed. For example, the resource may be computer resource (e.g., stored data or a networked computer account), a physical resource (e.g., a tangible object or a physical location, such as a building), or other electronic resource or communication between computers (e.g., a communication signal corresponding to an account for performing a transaction). Some non-limiting examples of a resource may include a good or service, a physical building, a computer account or file, or a payment account. In some embodiments, a resource may refer to a financial product, such as a loan or line of credit.

A "resource provider" may be an entity that can provide a resource such as goods, services, information, and/or access, e.g., to a computer or a building. Examples of a resource provider includes merchants, access devices, secure data access points, etc. A "merchant" may typically be an entity that engages in transactions and can sell goods or services, or provide access to goods or services. A resource provider may operate a computer to perform operations, which can also be generically referred to as a "resource provider computer".

The term "access request" generally refers to a request to access a resource. The access request may be received from a requesting computer, a user device, or a resource computer, for example. The access request may include authorization information, such as a user name, account number, or password. The access request may also include and access request parameters, such as an access request identifier, a resource identifier, a timestamp, a date, a device or computer identifier, a geo-location, or any other suitable information. The access request may be an "authorization request message," which may be an electronic message that requests authorization for an interaction. In some embodiments, an authorization request message can be sent to an authorization computer and/or an issuer of a payment card to request authorization for a transaction. According to some embodiments, an authorization request message may comply with ISO 8583, a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" or "user information" including, by way of example only: a service code, a CVV (card verification value), a dCVV (dynamic card verification value), a PAN (primary account number or "account number"), an access token, a user identifier (e.g., user name), an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in identifying and/or determining whether to authorize a transaction.

The term "access data" or "authorization information" generally refers to information about a user and/or a device that is making an access request for a resource. The access data may be used to determine whether to grant the access request, e.g., as determined by an access server or an authorizing entity (server).

An "access response" (e.g., an authorization response message") may be a message that responds to an access/authorization request. In some cases, it may be an electronic message reply to an authorization request message generated by an issuing financial institution or an authorization computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

The term "access rule" (also just referred to as a rule) may include any procedure or definition used to determine an access rule outcome for an access request based on certain criteria. In some embodiments, the rule may comprise one or more rule conditions and an associated rule outcome. A "rule condition" may specify a logical expression describing the circumstances under which the outcome is determined for the rule. A condition of the access rule may be involved by an access request parameter based on the parameter having a specific parameter value, based on the parameter value being within a certain range, based on the parameter value being above or below a threshold, or any combination thereof. An "access rule" may include a fraud rule. Exemplary access rules may include thresholds which may trigger such rules. For example, an exemplary access rule may be "flag for review if there are more than 10 items in the order."

An "access rule outcome" of an access rule may represent an outcome determined by that rule based on one or more conditions of the rule and the parameters of the access request. For example, an access rule may provide an access rule outcome of either "monitor," "reject," "accept," or "review," when its conditions are involved by an access request.

The term "access request outcome" (also called "access decision") may include any determination of whether to grant access to the resource. The access request outcomes may include "monitor," "accept," "reject," or "review." In some embodiments, an access request outcome for an access request may be "reject" if any of the access rules have an access rule outcome of "reject." In some embodiments, an access request outcome for an access request may be "accept" if any of the access rules have an access rule outcome of "accept," regardless of any outcome being "reject." An access request outcome of "accept" may cause the access request to be granted. An access request outcome of "reject" may cause the access request to be denied. The "review" outcome may initiate a review process for the access request. In various embodiments, other outcomes or other meanings of these outcomes may be used.

The term "outcome label" may refer to an actual outcome of an access request, such as a historical access request used as part of a training dataset. The outcome label might or might not be consistent with the access request outcome (i.e., it might be fraud). Example outcome labels are that the access request was valid (e.g., authentic request from suitable user) or invalid (e.g., fraud/malicious). Information can be provided about whether the outcome label and the access request outcome were consistent, e.g., both identified request as valid or invalid. Differences can result in false positives or false negatives.

"Authentication" or "authenticating" may be the process of proving or verifying certain information, and/or verifying the identity of the source of that information. For example, a user may provide authentication data that is unique or only known to the user to prove the identity of the user. Examples of different types of authentication data may include biometrics (e.g., fingerprint, palm print, face recognition, iris and/or retina recognition, voice recognition, gait, or other human characteristics), passcode, PIN, answers to security question(s), cryptographic response to challenge, human and/or device signature, etc.

A "user" may include an individual. In some embodiments, a user may be associated with one or more personal accounts and/or mobile devices. The user may also be referred to as a cardholder, account holder, or consumer.

A "historical transaction database" can include a database for transaction data for many accounts (e.g., over 1000, 10,000, 100,000, 1 million, or the like) and the transaction data can be permanently stored in the database. If data is purged from the historical transaction database, it can be purged after a long period of time (e.g., transactions over 1, 5, 10 years old, etc.). The historical transaction database may utilize disk storage of the same device as a cache, or local and/or disk storage of one or more devices that are remote with respect to the device providing the cache. Generally, the historical transaction database may utilize storage that is not as quickly accessed as the cache discussed herein.

A "risk score" may include a value associated with an amount of risk. In some embodiments, a risk score may include an arbitrary designation or ranking that represents the risk that a transaction may be fraudulent. The risk score may be represented by a number (and any scale), a probability, or in any other relevant manner of conveying such information.

A "rule profile" may include a plurality of rules customized for a user. The plurality of rules included in the rule profile may be used collectively to assess the risk of access requests. In some examples, the rule profiles may be organized thematically, such that the rules in a particular rule profile are collected based on themes or situations. Then a respective user can access multiple rule profiles for different situations. For example, the choice of a rule profile may be organized based on the type of access request for which the rules are used to evaluate risk. A profile may refer to identifying information for different types of access requests (e.g., transactions). Different types of access requests can include different profiles. Further, profiles can include one or more rules that are associated with the profile. A profile name can correspond to a type of access requests that often occurs for resource providers.

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer. An authorizing entity may operate a computer to perform operations, which can also be generically referred to as an "authorizing entity computer".

A "user device" may comprise any suitable electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of user devices include mobile phones (e.g. cellular phones), PDAs, tablet computers, net books, laptop computers, personal music players, hand-held specialized readers, etc. Further examples of user devices include wearable devices, such as smart watches, fitness bands, ankle bracelets, rings, earrings, etc., as well as automobiles with remote communication capabilities. A user device may comprise any suitable hardware and software for performing such functions, and may also include multiple devices or components (e.g. when a device has remote access to a network by tethering to another device—i.e. using the other device as a modem—both devices taken together may be considered a single user device).

An "access device" may be any suitable device that provides access to a remote system. An access device may also be used for communicating with a resource provider computer, an authorizing computer, or any other suitable system. An access device may generally be located in any suitable location, such as at the location of a resource provider or merchant. An access device may be in any suitable form. Some examples of access devices include POS or point of sale devices (e.g., POS terminals), cellular phones, PDAs, personal computers (PCs), table PCs, hand-held specialized readers, set-top boxes, electronic cash registers (ECRs), automated teller machines (ATMs), virtual cash registers (VCRs), kiosks, security systems, access systems, terminals, and the like. An access device may use any suitable contact or contactless mode of operation to send or receive data from, or associated with, a user communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. Other examples of access devices include devices (e.g., locks, gates, access control boxes, etc.) that control physical access to locations (e.g., venues, transit stations, homes, offices, buildings, etc.) as well as software devices that control access to data or information. In embodiments, the access device may be configured to charge or recharge a user device via contact or contactless modes of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

The term "providing" may include sending, transmitting, making available on a web page, for downloading, through an application, displaying or rendering, or any other suitable method. In various embodiments of the invention, rule profiles, rule outcome frequencies, and rule outcome disposition frequencies may be provided in any suitable manner.

DETAILED DESCRIPTION

A rules suggestion engine may suggest a profile of classification rules to a merchant for access requests. The disclosed system can optimize weights for the profile of rules using a cost function based on a training set of historical access requests. The system optimize the weights using stepwise regression or other machine learning (ML) techniques. The system can determine a profile score based on the optimized weights, for example by summing the weights. The system can classify the profile score, e.g., using classification thresholds, which may be done via machine learning (ML). The system can use a receiver operating characteristic (ROC) analysis for various threshold values, enabling a user to select a suitable threshold. The ROC can be used in the optimization as well, to determine weights that provide optimal area under a curve for ROC. The system can further optimize by adding or removing rules from the profile of rules.

I. Resource Security System

A resource security system may be used to grant or deny access to resources. In addition, the resource security system may implement access rules to reject access requests having parameters indicative of fraud. For purposes of brevity, an access rule may also be called a rule in the description. The resource security system may evaluate the performance of the access rules based on reports of fraudulent access. The resource security system may determine whether the rules are used and whether the rules continue to be applicable to the system. If a rule is not used, then the resource security system can determine whether the rule should be removed from the system.

A resource security system may receive requests to access a resource. The resource security system may include an access server for determining an outcome for the access request based on access rules. The access requests could include attempted transactions, and the requestor information associated with the access requests could include a credit card number, IP address, personal identification number (PIN), password, email address, shipping address, etc. The resource security system may also include an access rule generation system for generating and selecting the access rules. The resource security system is described in further detail below.

FIG. 1A shows a resource security system 100 for authorizing access to resources, in accordance with some example embodiments. The resource security system 100 may be used to provide authorized users access to a resource while denying access to unauthorized users. In addition, the resource security system 100 may be used to deny fraudulent access requests that appear to be legitimate access requests of authorized users. The resource security system 100 may implement access rules to identify fraudulent access requests based on parameters of the access request. The access rules may be selected based on their performance and their stability over time.

The resource security system 100 can include a resource computer 110. The resource computer 110 may control access to a physical resource 118, such as a building or a lockbox, or an electronic resource 116, such as a local computer account, digital files or documents, a network database, an email inbox, a payment account, or a website login. The resource computer 110 may be controlled by a resource computer user 111. In some embodiments, the resource computer may be a webserver, an email server, or a server of an account issuer. The resource computer 110 may receive an access request from a user 140 via a user device 150 (e.g., a computer or a mobile phone) of the user 140. The resource computer 110 may also receive the access request from the user 140 via a request computer 170 coupled with an access device 160 (e.g., a keypad or a terminal). In some embodiments, the request computer 170 may be a service provider that is different from the resource provider.

The access device 160 and the user device 150 may include a user input interface such as a keypad, a keyboard, a finger print reader, a retina scanner, any other type of biometric reader, a magnetic stripe reader, a chip card reader, a radio frequency identification reader, or a wireless or contactless communication interface, for example. The user 140 may input authorization information into the access device 160 or the user device 150 to access the resource. The authorization information may include one or more of a user name, an account number, a token, a password, a personal identification number, a signature, and a digital certificate, for example. In response to receiving authorization information input by the user 140, the user device 150 or the request computer 170 may send an access request to the resource computer 110 along with one or more parameters of the access request. The access request may include the authorization information provided by the user 140.

In one example, the user 140 may enter one or more of an account number, a personal identification number, and password into the access device 160, to request access to a physical resource (e.g., to open a locked security door in order to access a building or a lockbox) and the request computer 170 may generate and send an access request to the resource computer 110 to request access to the resource. In another example, the user 140 may operate the user device 150 to request that the resource computer 110 provide access to the electronic resource 116 (e.g., a website or a file) that is hosted by the resource computer 110. In another example, the user device 150 may send an access request (e.g., an email) to the resource computer 110 (e.g., an email server) in order to provide data to the electronic resource 116 (e.g., deliver the email to an inbox). In another example, the user 140 may provide an account number and/or a personal identification number to an access device 160 in order to request access to a resource (e.g., a payment account) for conducting a transaction.

In some embodiments, the resource computer 110 may verify the authorization information of the access request based on information stored at the request computer 170. In other embodiments, the request computer 170 may verify the authorization information of the access request based on information stored at the resource computer 110.

The resource computer 110 may receive the request substantially in real-time (e.g., account for delays computer processing and electronic communication). Once the access request is received, the resource computer 110 may determine parameters of the access request. In some embodiments, the parameters may be provided by the user device 150 or the request computer 170. For example, the parameters may include one or more of: a time that the access request was received, a day of the week that the access request was received, the source-location of the access request, the amount of resources requested, an identifier of the resource being request, an identifier of the user 140, the access device 160, the user device 150, the request computer 170, a location of the user 140, the access device 160, the user device 150, the request computer 170, an indication of when, where, or how the access request is received by the resource computer 110, an indication of when, where, or how the access request is sent by the user 140 or the user device 150, an indication of the requested use of the electronic resource 116 or the physical resource 118, and an indication of the type, status, amount, or form of the resource being requested. In other embodiments, the request computer 170 or the access server 120 may determine the parameters of the access request.

While the access request may include proper authentication information, the resource computer may send the parameters of the access request to the access server 120 in order to determine whether the access request is fraudulent. The access server 120 may store one or more access rules in an access rules library 122 for identifying a fraudulent access request. Each of the access rules in the access rules library 122 may include one or more conditions corresponding to one or more parameters of the access request.

The access server 120 may determine an access request outcome indicating whether the access request should be accepted (e.g., access to the resource granted), rejected (e.g., access to the resource denied), or reviewed by comparing the access rules in the access rules library 122 to the parameters of the access request as further described below. In some embodiments, instead of determining an access request outcome, the access server 120 may determine an evaluation score based on outcomes of the access rules. The evaluation score may indicate the risk or likelihood of the access require being fraudulent. If the evaluation score indicates that the access request is likely to be fraudulent, then the access server 120 may reject the access request.

The access server 120 may send the indication of the access request outcome to the resource computer 110 (e.g., accept, reject, or review). In some embodiments, the access server 120 may send the evaluation score to the resource computer 110 instead. The resource computer 110 may then grant or deny access to the resource based on the indication of the access request outcome or based on the evaluation score. The resource computer 110 may also initiate a review process for the access request.

In some embodiments, the access server 120 may be remotely accessed by a user. The access server 120 may store data in a secure environment and implement user privileges and user role management for accessing different types of stored data. For example, user privileges may be set to enable users to perform one or more of the following operations: view logs of received access request, view logs of access request outcomes, enable or disable the execution of the access rules in the access rules library 122, update or modify the access rules in the access rules library 122, change certain access request outcomes. Different privileges may be set for different users.

The resource computer 110 may store access request information for each access requests that it receives. The access request information may include the parameters of each of the access requests. The access request information may also include an indication of the access request outcome for the access request. The resource computer 110 may also store validity information corresponding to each access request. The validity information for an access request may be initially based on its access request outcome. The validity information may be updated based on whether the access request is reported to be fraudulent. In some embodiments, the access server 120 or the request computer 170 may store the access request information and the validity information.

The access server 120 may include a janitor computer 180. The janitor computer can be used to identify the rate of use of the access rules in the access rules library 122. The janitor computer can generate a report to assist a user in determining the usage rate of rules.

II. Rules Suggestion Engine

The disclosed system and methods may make use of a rules suggestion engine for the purpose of suggesting a profile of classification rules for access requests to a merchant, and subsequently may optimize weights for the suggested profile of rules, and compute a profile score based on the optimized weights.

A. Example System

Figure 1B:
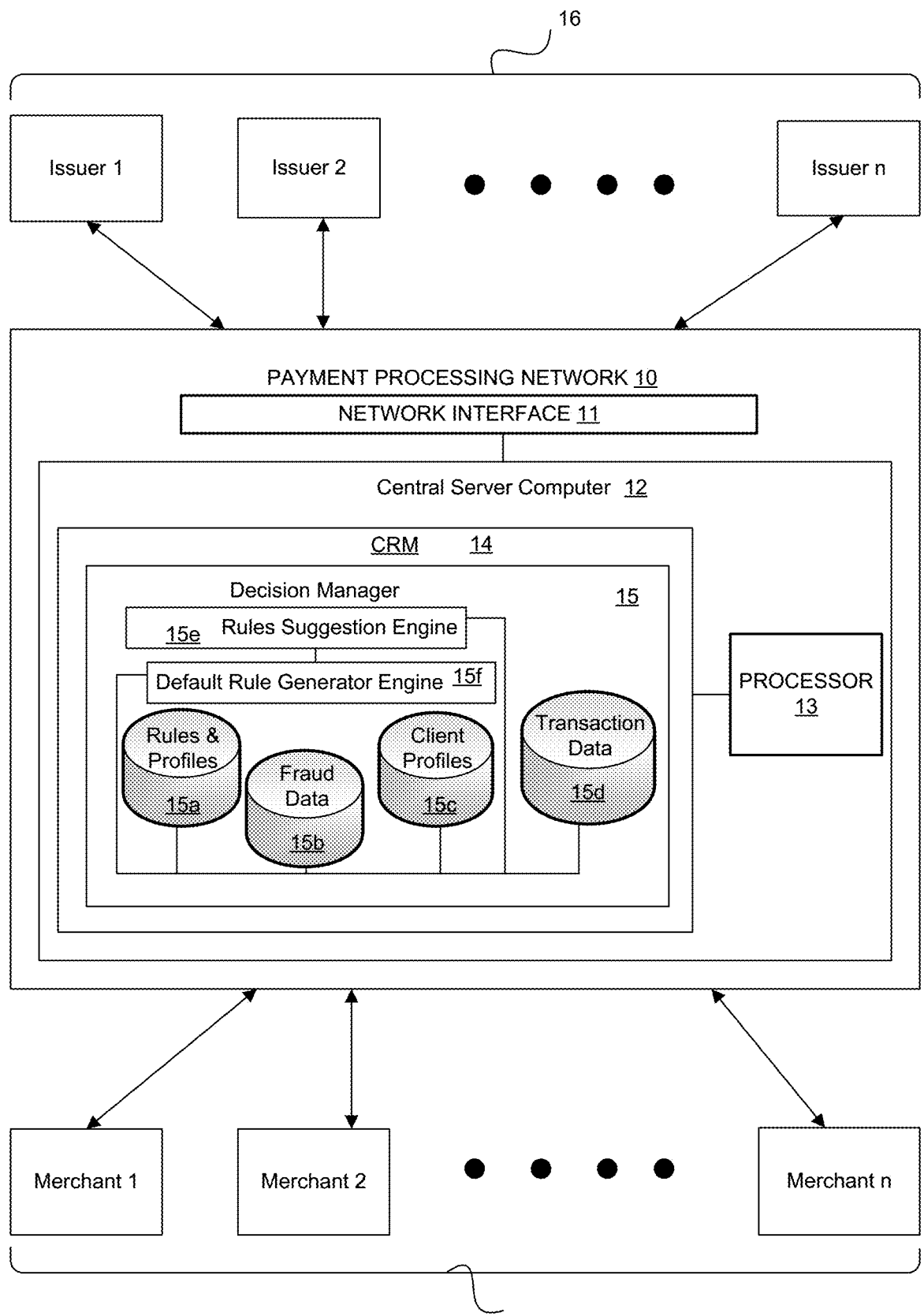
FIG. 1B shows a system having a rules suggestion engine, in accordance with some example embodiments.

FIG. 1B shows an example system having a rules suggestion engine 15e according to embodiments of the present disclosure. The system may be part of the resource security system 100 of FIG. 1A. Further details of a rules suggestion engine are described further in U.S. Pat. No. 8,645,250 B2, entitled "Rules Suggestion Engine," which is herein incorporated by reference in its entirety for all purposes. Rules suggestion engine 15e can suggest a profile of classification rules for access requests to a merchant, and subsequently may optimize weights for the suggested profile of rules, and compute a profile score based on the optimized weights.

In this example, a plurality of merchants 17 and issuers 16 communicate with a payment processing network 10 using a network interface 11. Payment processing network 10 also communicates with a central server computer 12 which includes a processor 13 and a Computer Readable Medium (CRM) 14. A decision manager module 15 may be stored on CRM 14 that provides fraud detection functionality to different users.

In an example, a rule suggestion engine 15e along with rules and profiles database 15a, fraud data database 15b, client profiles database 15c, and transaction data database 15d (which may be a historical transactions database) are shown as part of decision manager module 15. Decision manager module 15 is configured to generate fraud detection rules and merchant profiles in a fraud detection system. Aspects of the decision manager module 15 are further explained in U.S. Pat. No. 9,760,861, entitled "Fraud Detection System User Interface," by B. Scott Boding and Cory H. Siddens, filed on Apr. 27, 2012, which is herein incorporated by reference in its entirety.

Merchants 17 may operate one or more client computers that are capable of purchasing goods or services. In some examples, a user may be a merchant, an employee of the merchant, or any other individual who has access to a client computer.

In a typical transaction, a consumer may purchase goods or services at a merchant 17. The merchant 17 may operate a Website running on a merchant server computer, and may be an e-commerce merchant. The transaction order details for an order may be transmitted to the central server computer 12 by the one or more merchants 17. The central server computer 12 may process the transaction to determine if the order should be accepted and processed, or rejected as being potentially fraudulent. If the central server computer 12 determines that the order should be accepted, then the central server computer 12 may communicate with one or more issuers 16 to obtain payment for the one or more merchants 17. If the central server computer 12 determines that the transaction is clearly fraudulent or should be sent to a human reviewer to determine if the order should be accepted or rejected, then the central server computer 12 may provide this information to the one or more merchants 17 so that they may take the appropriate action.

For illustrative purposes, a certain number of components are shown in FIG. 1. However, some examples may include more than one of each component. In addition, some examples may include fewer than all of the components shown in FIG. 1. Also, although the server computer 12 is shown as being outside of the merchants 17, it may be located within or operated by the merchants 17 in other examples.

The rules and profiles database 15a contains different set of rules and profiles for different merchants. Rules and profiles database 15a may contain core set of rules and rule profiles specific to each merchant. New rules and profiles developed in response to fraud patterns and in response to specific types of business needs can be stored on rules and profiles database 15a as well.

The fraud data database 15b stores fraud data, e.g., statistics and desired transaction attributes provided by merchants 17 and issuers 16. In one example, fraud data can be shared between the merchants if it is consistent with privacy laws. For example, if merchant A is a large electronics retailer and has a fraud profile A, it may be possible to share profile A or aspects of profile A with a merchant B that is a small electronics retailer. Such retailers may view fraud from substantially the same perspective and the profiles of such merchants may be commonly used in some cases.

Different merchant profiles can be stored in the client profile database 15c. Merchant profiles may include information about the merchant's company, such as size of the company, number of transactions per month, type of the company and such.

Transaction data database 15d contains historical transaction data from a merchant. In another example, historical transaction data from other merchants may be used as well. Historical transaction data may be used to generate custom rules for fraud detection based on a user specified attribute. Transaction data may include data related to specific transactions, and may include the type of goods or services purchased, the type of payment mechanism used, the quantity of goods or services purchased, the shipping address, the billing address, and other information relating to ordering goods.

The default rule generator engine 15f can use data from the fraud data database 15b, rules and profiles database 15a and/or client profiles database 15c, to generate a set of default rules and profiles and to update previous rules and profiles. In some examples, each type of business can have a different set of default profiles and rules. In an embodiment, the rule generator engine 15f can use a decision tree to generate universal rules based on available variables.

Because payment processing network 10 receives input from many types of merchants 17, it can determine increased fraud patterns of particular like businesses as well as current fraud techniques implemented by other businesses. With such information, the rule suggestion engine 15e can assess the type of rules which may be beneficial to each type of business based on a standard set of attributes and based on a specified attribute having a correlation. Since each business differs from another, the rules can still be modified, if desirable.

To modify fraud detection rules, each merchant 17 can login through a web portal using a client computer to payment processing network 10 and set, remove, and modify rules. The rules selected by each merchant 17 can be stored on the client profile database 15c. Accordingly, each time a transaction is processed for a merchant by the payment processing network 10, that merchant's client profile can be utilized.

The rules suggestion engine 15e can operate in an any number of ways, depending on the level of processing, input/feedback, and base client information provided to the payment processing network 10 from both the merchants and other relevant sources, e.g., other card networks fraud reports, issuers, acquirers, etc. The rules suggestion engine 15e can be utilized to generate a set of rules or one or more specific profiles for a user, such as a merchant or other client.

B. Rule Profiles

A "rule profile" may include a plurality of rules customized for a user, such as a merchant. The rule profile may be designed to take into account the user's particular or segmented constraints, for example business constraints, acceptability of false positives and negatives, or risk tolerance. A rule profile may also be referred to as a rule set. The plurality of rules included in the rule profile may be used collectively to assess the risk (e.g., risk score) of access requests. For example, the rules in the rule profile that are triggered by a respective access request can be summed with rule weights to obtain a profile score, as described below, and the access request can then be classified based on the profile score. For example, the profile score may indicate a likelihood or a risk of the access request being fraudulent. In a typical embodiment, the rule profile may be obtained from the output of a rule suggestion engine, such as rules suggestion engine 15e in the example of FIG. 1.

In some examples, a respective merchant can access multiple rule profiles for different situations. The choice of a rule profile may be organized based on the type of access request for which the rules are used to evaluate risk. Thus, an access request belonging to a particular channel may be filtered and/or routed to a particular profile. In an example, there may be channels for mail order, telephone order, and e-commerce, such that when the system needs to evaluate the risk of an access request occurring in e-commerce, the system may filter or route the access request to a particular rule profile for e-commerce. Furthermore, if the rule suggestion engine is configured to handle a particular type or profile, it may suggest rules to use for that type or profile. In another example, models may be generated for an overall region, for example, the United States or European Union.

In some examples, not all the rules that are generated by the rule suggestion engine are active. For example, the user may select which rules to activate, such as via a GUI input. In another example, the active rules may be collected into a single rule profile. In some embodiments, inactive rules can be aggregated, configured and/or tested in a collection.

C. Computation of Profile Scores

In an embodiment, the system uses the rules profile and rule weights to determine a profile score for a given access request, based on which rules triggered for the access request. The system can use the profile score in order to make an access decision for the access request. For example, the profile score may indicate a likelihood or a risk of the access request being fraudulent. In some embodiments, the system may make the access decision by comparing the profile score to a threshold value.

Figure 2A:
FIG. 2A shows an example computation of a profile score for a rules profile, in accordance with some embodiments.

FIG. 2A shows an example presentation of a profile score for a rules profile, in accordance with an embodiment. In this example, a graphical user interface (GUI) 200 may display a plurality of rules 205 and rule weights 210. The plurality of rules 205 may be referred to in the aggregate as a rules profile. Rule weights may also be referred to herein as rule scores or point values. The rule weights 210 may be related to the rules 205, in that a respective rule weight may correspond to a respective rule.

A respective rule can include an access request outcome, such as "monitor" 214, "accept" 218, "review" 220, and "reject" 225. A user can select a box to specify an access request outcome or action to be taken (monitor, accept, review, or reject) for each rule in response to the rule being triggered. In particular, the outcome "monitor" 214 means that the system tracks whether the corresponding rule has triggered. For example, the system may not take any action in response to a rule with outcome "monitor" 214 rule being triggered, other than storing a record indicating that the rule was triggered. By contrast, outcomes "accept" 218 and "reject" 225 may refer to accepting or rejecting the access request, respectively, and "review" 220 may refer to reviewing additional details of the access request, for example by a human reviewer or by an automated system. In some embodiments, historical training data and/or stored statistics can be used to suggest the rule, e.g., based on whether rejecting the access request would have caught fraud or whether the rule outcome would have been a false positive. Rules can have monitor in combination with the other actions.

In some embodiments, an access request outcome for an access request may be "reject" if any of the access rules have an access rule outcome of "reject." In some embodiments, an access request outcome for an access request may be "accept" if any of the access rules have an access rule outcome of "accept," regardless of any outcome being "reject." An access request outcome of "accept" may cause the access request to be granted. An access request outcome of "reject" may cause the access request to be denied. The "review" outcome may initiate a review process for the access request. In various embodiments, other outcomes or other meanings of these outcomes may be used.

Alternatively, in some embodiments, the weights of all the triggered rules may be summed to compute a profile score, regardless of what action is specified by the rules. For example, the disclosed system and methods for generating a recommendation may be utilized together with, or in parallel with, the actions specified by the rules. Accordingly, in practice a user may create a set of rules without assigning actions to the rules, thereby essentially creating a statistical model. The disclosed system and methods may be particularly useful in such a case, since the final action recommendation would be based solely on the profile score, which in turn is based on the optimized rule weights.

A user, such as a merchant, may obtain the rules, for example from a rules selection engine, as described above. In some examples, a user may determine the rule weights, for example based on knowledge, experience, or intuition about the respective rules' predictive power to classify access requests as valid or fraudulent. However, in embodiments, the disclosed system and methods can instead optimize the rule weights 210 so as to optimize a classification accuracy (for example, by optimizing a probability of correct ranking), as described herein below.

In some embodiments, the rule weights 210 corresponding to rules 205 that are triggered can be summed to determine a profile score. In an example, one way to do so is to sum the respective rule weights, $w_i$, multiplied by a respective binary value $t$ indicating whether a respective rule $r_i$ has triggered: $S=\Sigma_i w_i t_i$, where S is the profile score. Note that the profile score should not be confused with the rule scores themselves, but rather is a sum of the rule scores or weights 210. In various embodiments, the profile score S may be computed in some other way based on the rule weights 210, for example as another function of the rule weights 210, or may otherwise depend on the rule weights 210.

In some embodiments, the weights of all the triggered rules may be summed regardless of what action is specified by the rules. For example, the disclosed system and methods for generating a recommendation may be utilized together with, or in parallel with, the actions specified by the rules. Accordingly, in practice a user may create a set of rules without assigning actions to the rules, thereby essentially creating a statistical model. The disclosed system and methods may be particularly useful in such a case, since the final action recommendation would be based solely on the profile score, which in turn is based on the optimized rule weights.

In an embodiment, the profile score may be used to determine an access response to an access request, i.e. the system may determine whether to allow or reject an access request based on the profile score. For example, the access response decision may be made based on comparing the profile score against a threshold value. In another example, the system may use one or more special rules in order to determine the access response based on the profile score. For example, such a special rule may set a threshold value of the profile score for accepting or rejecting the access request, and may optimize the threshold value similar to optimizing the rule weights. Thus, by optimizing the rule weights 210, the disclosed system and methods can help ensure that the access responses are accurate. Accordingly, the rule weights 210 can be important, and can help determine access responses.

In various embodiments, the access response decision may also be made based on machine learning (ML) or neural network methods, or some function of the profile score, or be based on the profile score in any other way, and is not limited by the present disclosure. For example, the system may make use of decision trees to consider rules as features in a model, and to build a rule-based model. In another example, the system may use a second rule suggestion engine to determine more complex relationships among the profile score, rules, and the decision. For instance, the second rule suggestion engine may determine that when the profile score is greater than 35 and a specific combination of rules trigger, the access response should be "reject." The access response could also be based on the weights of the triggered rules. In an embodiment, the weights would be part of the ML model.

In some embodiments, the system can also optimize the rule used to determine the access response from the profile score. For example, the system can optimize the value of a threshold used for comparison against the profile score when deciding what access response to recommend.

FIG. 2B shows an example presentation of a profile score for a rules profile, in accordance with an embodiment. In this example, a GUI 230 may display rules profile 235. The system may use the profile score to determine an access response to an access request. Actions for the different rules are provided as monitor 244, accept 250, review 240, and reject 255. For example, the system may decide to review rule 242 when triggered, and may decide to monitor rule 246 when that rule is triggered. The order of the rules can specify a hierarchy, with the first triggered rule specifying an action. In another example, the system may decide to accept or to reject a respective rule. The system may determine these decisions based on the respective profile scores associated with the rules, as described herein.

In some embodiments the user may choose a respective action associated with a respective rule, for example by selecting boxes in GUI 230 as shown. However, in many cases, in practice a user may create a set of rules without assigning actions to the rules, thereby essentially creating a statistical model. The disclosed system and methods may be particularly useful in such a case, since a final action recommendation would then be based solely on the profile score, which in turn is based on the optimized rule weights.

FIG. 2C shows example rule actions, in accordance with an embodiment. In this example, a GUI 260 may display a plurality of rules 265. Rules 265 may be associated with rule weights 270 and rule actions 275. As in the example of FIG. 2A, the system may determine a profile score by adding the rule weights 270 for respective rules in the rules profile 265 that are triggered in a respective access request.

For example, in a particular access request, suppose that rules "browser language anomaly" 280, "browser session anomaly" 285, and "cookies disabled" 290 have triggered. The system may then determine the profile score is 45 by adding the rule weights 270 associated with these three triggered rules. Accordingly, the system may determine an action of "monitor" in response to the access request, since rules 280, 285, and 290 all have respective rule actions 275 of "monitor."

In some embodiments, an access request outcome for an access request may be "reject" if any of the access rules have an access rule outcome of "reject." In some embodiments, an access request outcome for an access request may be "accept" if any of the access rules have an access rule outcome of "accept," regardless of any outcome being "reject." An access request outcome of "accept" may cause the access request to be granted. An access request outcome of "reject" may cause the access request to be denied. The "review" outcome may initiate a review process for the access request. In various embodiments, other outcomes or other meanings of these outcomes may be used.

Alternatively, in some embodiments, the weights of all the triggered rules may be summed to compute a profile score, regardless of what action is specified by the rules. For example, the disclosed system and methods for generating a recommendation may be utilized together with, or in parallel with, the actions specified by the rules. Accordingly, in practice a user may create a set of rules without assigning actions to the rules, thereby essentially creating a statistical model. The disclosed system and methods may be particularly useful in such a case, since the final action recommendation would be based solely on the profile score (e.g., by comparing to a classification threshold, as may be done via a machine learning model), which in turn is based on the optimized rule weights.

In some implementations, for most of the single rules, their actions are set to be "monitor". The "monitor" status would not affect the access decision (access request outcome), but the status can provide a way to see how and when the rule condition is triggered, and use this knowledge to analyze its potential impact. Whereas, a group of rules can be used together to determine a profile score, which can be used to determine the access decision, as described herein. In instances where a single rule leads to access approval or decline, the corresponding conditions typically have strong indications for legitimate or fraud behaviors. In such a case, their rule action "accept" or "reject" can override other decisions generated by other rules, e.g., the decision determined using the profile score.

Typically, users may assign weights manually, based on knowledge and experience. Users may often guess at suitable values for the weights, which can lead to inaccurate results, e.g. false negative or false positive classifications. For example, a false negative for an access request related to a transaction could be a subsequent chargeback. Accordingly, there is a need to optimize the weights automatically for each rule, and/or to optimize a profile score automatically for the rules, so as to improve accuracy, ease of use, and consistency of classification.

III. Optimizing Weights for a Rule Profile

The disclosed system and methods can optimize weights for some or all of the rules in a rule profile. In an embodiment, a user can specify which rules in a rule profile to optimize. In another embodiment, the system can automatically optimize the weights, based on the output of the rules suggestion engine, without requiring user input. The disclosed system and methods can use a cost function to optimize rule weights for a rule profile. For example, the cost function may be proportional to the area under a receiver operating characteristic (ROC) curve measuring the performance of a classifier. Optimizing the rule weights may also be referred to as auto-tuning.

In some examples, the rule weights may be optimized more than once, or may be updated due to changes. For example, if a user modifies a rule after its weight has already been optimized, the weight may no longer be optimal for the modified rule. In such a case the rule may need to be auto-tuned again. Additionally, the rules to be included in a profile can be optimized along with their weights.

A. Receiver Operating Characteristic Curve

Figure 3:
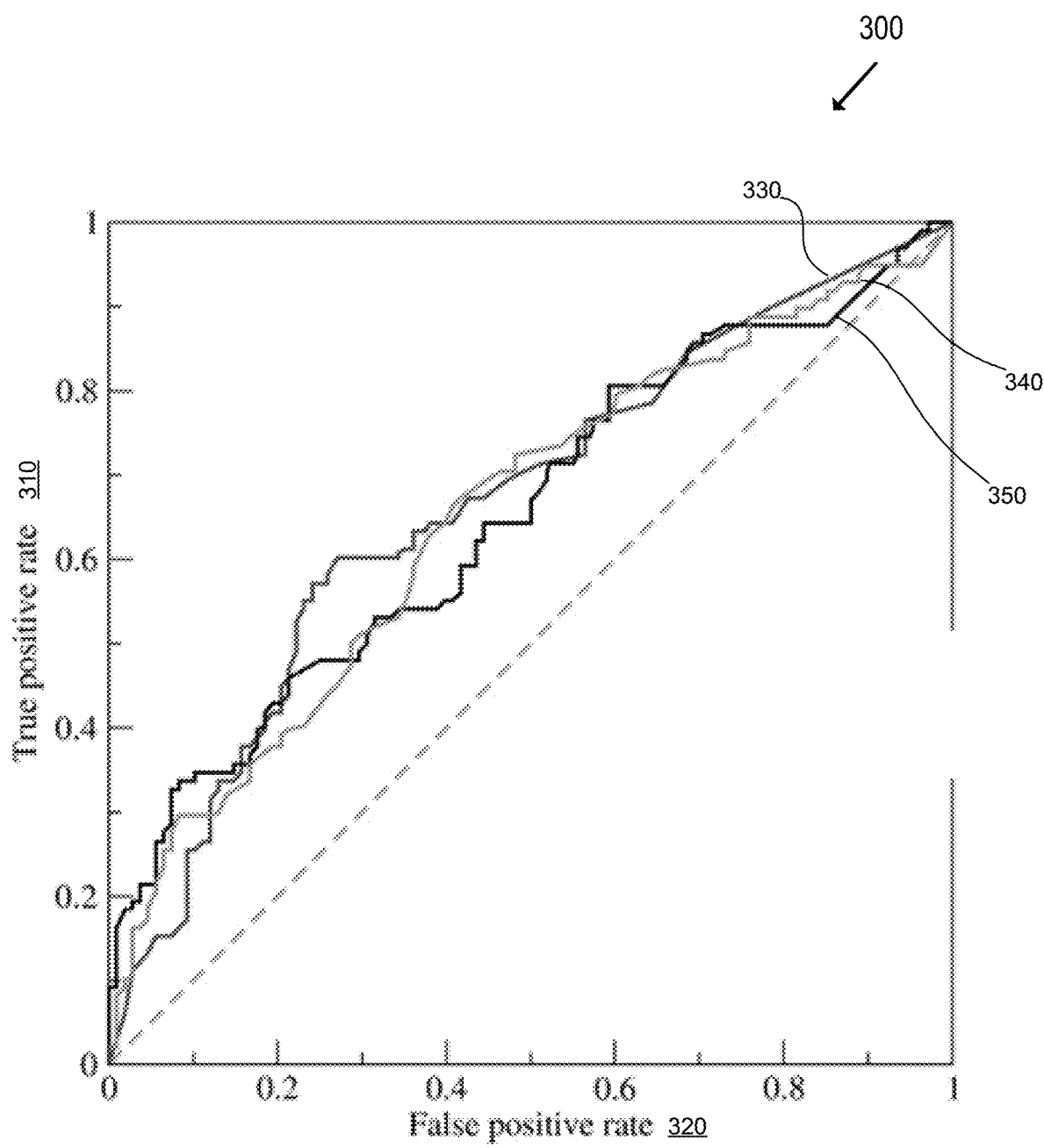
FIG. 3 shows an example receiver operating characteristic (ROC) curve.

FIG. 3 shows an example receiver operating characteristic (ROC) curve 300. The ROC curve 300 characterizes the validity and reliability of a given classifier, by plotting the classifier's true positive rate (TPR) 310 vs. its false positive rate (FPR) 320. TPR 310, also referred to as sensitivity or probability of detection, specifies the probability that the classifier correctly classifies a fraudulent access request as fraudulent. FPR 320, specifies the probability that the classifier erroneously classifies a non-fraudulent access request as fraudulent. The FPR 320 is related to the true negative rate (TNR), or specificity or selectivity, by FPR=1−TNR.

Thus, by plotting a particular classifier's TPR 310 vs. FPR 320, the ROC curve 300 provides information about that classifier indicating how well the classifier performs. In particular, for a classifier that fails to discriminate between true and false positives, it is to be expected that TPR 310 would be proportional to FPR 320. For example, if the classifier indiscriminately ranked 15% of all access requests as fraudulent, then the expected value of both the TPR 310 and FPR 320 would be 15%. Accordingly, for an indiscriminate classifier, the ROC curve 300 would be a straight line with TPR=FPR. Conversely, if the classifier successfully discriminates between true and false positives, the TPR 310 would be greater than FPR 320, and hence ROC curve 300 would be concave downward, since TPR 310 is bounded above by 1.

In this example, there are several curves 330-350 for different classifiers. For example, each classifier may correspond to a profile score computed with a different set of rule weights. In such an example, the system may classify a respective access request by determining the value of each rule for that access request, computing the profile score as a weighted sum of the rule values, and then comparing the resulting profile score to a threshold. Each respective ROC curves 330-350 then represents the TPR and FPR of that respective classification method, i.e. for that particular set of weights. In various embodiments, the respective classifiers may be related in other ways, and are not limited by the present disclosure.

The area under ROC curve 300 may be proportional to the probability of a classifier correctly ranking two randomly chosen access requests relative to each other. This area is also equivalent to the Wilcoxon test of ranks.

As another example, a model operational characteristic (MOC) curve can be used. An MOC curve may display a number of operational characteristics of an input decision model, including, but not limited to: detect rate; false positive ratio; maximum detectable rate; minimum false positive ratio; profile score; random false positive ratio; random detect rate; detection concentration; virtual detect rate, or any combination thereof. The operational characteristics may be determined by evaluating the performance of a decision model on a set of training (historical) access requests and outcomes. Further details on MOC curves can be found in U.S. Patent Publication No. 2020/0175388, which is incorporated by reference in its entirety.

B. Optimizing Weights of a Rule Profile Based on a Cost Function

A cost function may be a penalty for a classification that is inaccurate or incorrect relative to the actual validity of the access request, and may also be referred to as a loss function. For example, the least-squares method of regression uses the sum of squares of residuals as a cost function while optimizing the fit of the regression model parameters. Least-squares may be used for linear regression. For classification, logistic regression can be used to classify an access request as fraud or not. The classification can be binary or have more than two possible outcomes. An example optimization for logistic regression can use a maximum likelihood estimation function, which can optimize the weights to maximize the probability of the observed outcomes.

The cost function may be evaluated for a training set of data, such as historical access requests, based on data regarding the actual outcomes of the historical access requests. For example, if a set of rule weights produced a recommendation (access request outcome) to reject an access request that was actually valid (outcome label), this would be an incorrect classification. However, a recommendation to reject an access request that actually was fraudulent would be an accurate classification. The historical access requests could include transactions, and the requestor information could include a credit card number, IP address, personal identification number (PIN), password, email address, shipping address, etc.

In some embodiments, the system optimizes the rule weights by minimizing a cost function, as described herein below. The optimization can occur via iterations that update the weights so as to optimize the value of the cost function. For example, the system can use the area under an ROC curve, such as the area under curve (AUC) for ROC curve 300 in the example of FIG. 3 above, as a cost function while optimizing the weights for a rule profile. The system can also use other cost functions.

Figure 4:
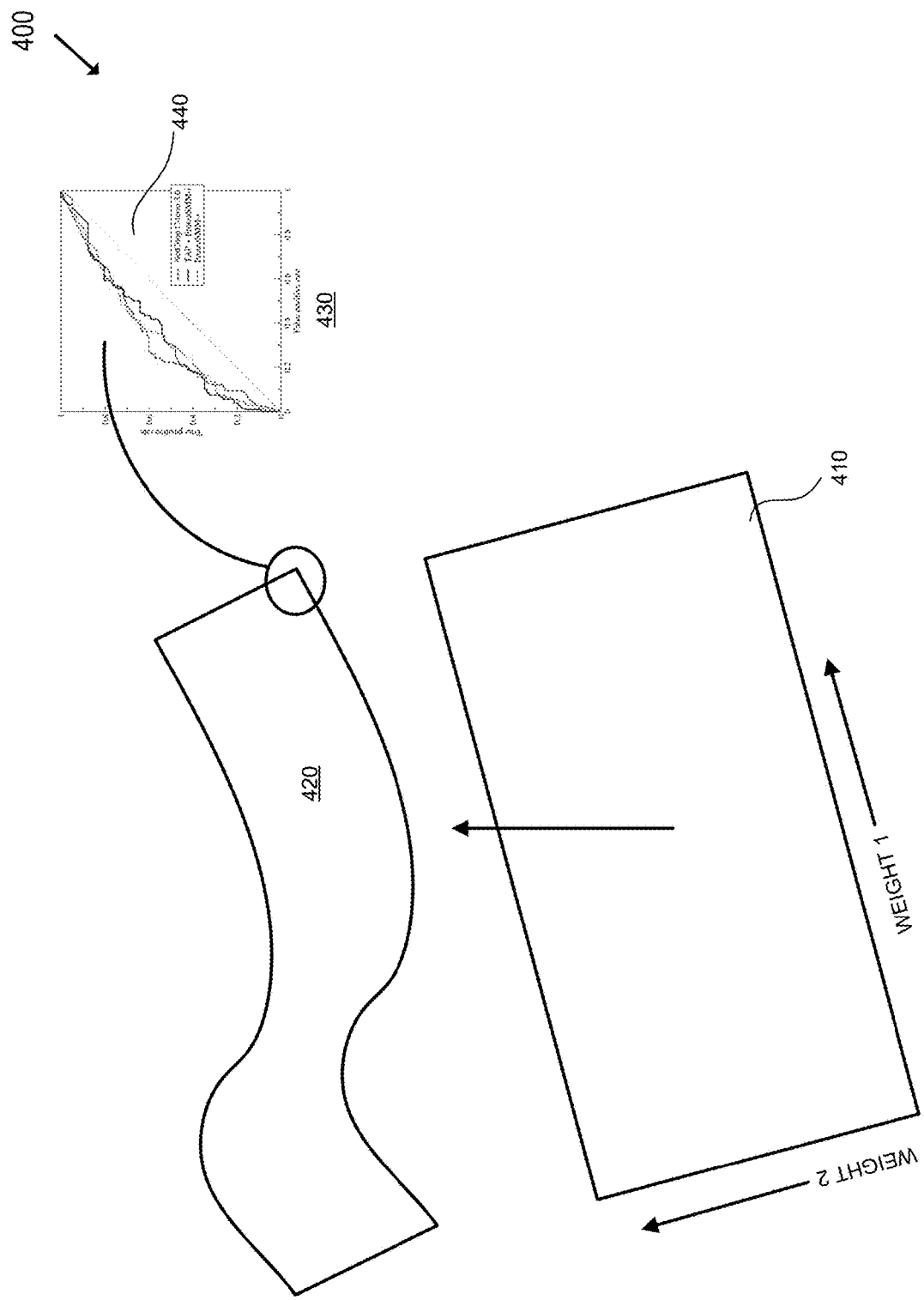
FIG. 4 shows optimization of rule weights based on a cost function, in accordance with embodiments of the present disclosure.

FIG. 4 shows optimization 400 of rule weights 410 based on values 420 of a cost function. In this example, a two-dimensional parameter space 410 represents weights 1 and 2, which are the weights corresponding to rules 1 and 2, respectively. This example is restricted to a two-dimensional weight space, corresponding to two rules, for ease of illustration. However, in a typical embodiment, the disclosed system and methods may use many more rules to determine a profile score, for example, a rule profile including several dozen rules, 100 rules, or even more. Accordingly, the system may use any number of weights and/or rules to determine a profile score, and is not limited by the present disclosure.

In this example, surface 420, representing values of a cost function 430, is plotted as a function of the rule weights 410. For each point in the parameter space of weights 410, representing an ordered set of weight values, the cost function 430 may be computed based on those weight values. In this example, cost function 430 may be based on the area 440 under an ROC curve. As described above, area 440 may be proportional to the probability of a classifier correctly ranking two randomly chosen access requests. Accordingly, cost function 430 may be proportional to a measure of classification accuracy. The cost function can be minimized or maximized, depending on how it is defined. In various embodiments, cost function 430 may be a measure of classification accuracy other than the area under an ROC curve, or may be any other cost function, and is not limited by the present disclosure.

The system can determine optimal values of the weights so as to optimize cost function 430 (e.g., by maximizing the classification accuracy). The optimization may be based on a training set of data, such as historical access requests. For example, the system may compute the model based on the rule profile and a given set of trial weights for the rules. Accordingly, the system can evaluate the cost function for those trial weights based on the training data.

In this example, determining the optimal weights may be equivalent to searching parameter space 410 for the point (or a set of points) at which cost function 430 is optimized. Thus, the determined optimal weights may provide substantially, or approximately, optimal classification for a given set of rules. For example, the classification may be optimal in the sense of maximizing area 440 and/or maximizing the probability of correct ranking of access requests when the profile scores are computed with the determined weights. Moreover, in some examples, the determined optimal weights can provide an intuitive guide for the reference of a user, such as a merchant, when creating a rules profile. In some embodiments, the optimization of the cost function 430 and/or maximization of area 440 may be approximate, and is not limited by the present disclosure.

In an embodiment, the optimization may be performed by linear regression. As part of the linear regression, a user may select a particular set of rules, such as a rule profile, to optimize. In some embodiments, the linear regression can also add rules, and compute a new accuracy in response to each added rule. This may be referred to as forward modification of the rules profile. If the addition of a respective rule results in a sufficiently high increase in accuracy (e.g., greater than a threshold), the rule can be kept. In an embodiment, the system can also perform backwards modification of the rules profile by removing rules and computing a new accuracy in response to each removal.

In another embodiment, the optimization may be performed by logistic regression. As part of the logistic regression, a user may select a particular set of rules (e.g., as defined in a rule profile) to optimize. The logistic regression can also add rule(s) and compute a new accuracy in response to each added rule. Such an addition may be referred to as forward modification of the rules profile. If the addition of a respective rule results in a sufficiently high increase in accuracy (e.g., greater than a threshold), the rule can be kept. The system can also perform backwards modification of the rules profile by removing rule(s) and computing a new accuracy in response to each removal.

In some embodiments, a profile score can instead be generated with a more complex function, for example a neural network. In such examples, the system may not generate a weighting that a user can use in creating a profile.

Because users may still wish to retain intuitive control or visibility (e.g., a merchant may wish for intuitive knowledge of the data for business reasons), in some embodiments the system determines an importance index instead of a weight for each rule. This optimization may also be done in a forward or backward manner.

FIG. 5 shows example optimized rule weights, in accordance with embodiments of the present disclosure. In this example, a rule profile 500 contains a set of rules 505, e.g. for a particular merchant to determine whether to accept or reject access requests. Coefficients 510 represent optimized weights for the respective rules 505. In particular, coefficients 510 may result from or be an output of the optimization process, such as optimization 400 of the example of FIG. 4. Importance indices 515 are normalized versions of coefficients 510, such that the largest coefficient has an importance index of 100%.

Significance 520 provides a measure of the confidence level of the values of the respective coefficients 510. Accordingly, significance 520 denotes how statistically significant the respective coefficients 510 and/or the respective importance indices 515 are. In this example, significance 520 is provided as an ordinal ranking, but in various embodiments, significance 520 may also be expressed as a confidence level, as a standard error in coefficient 510, or as coefficient 510 divided by a standard error, and is not limited by the present disclosure.

Figure 6:
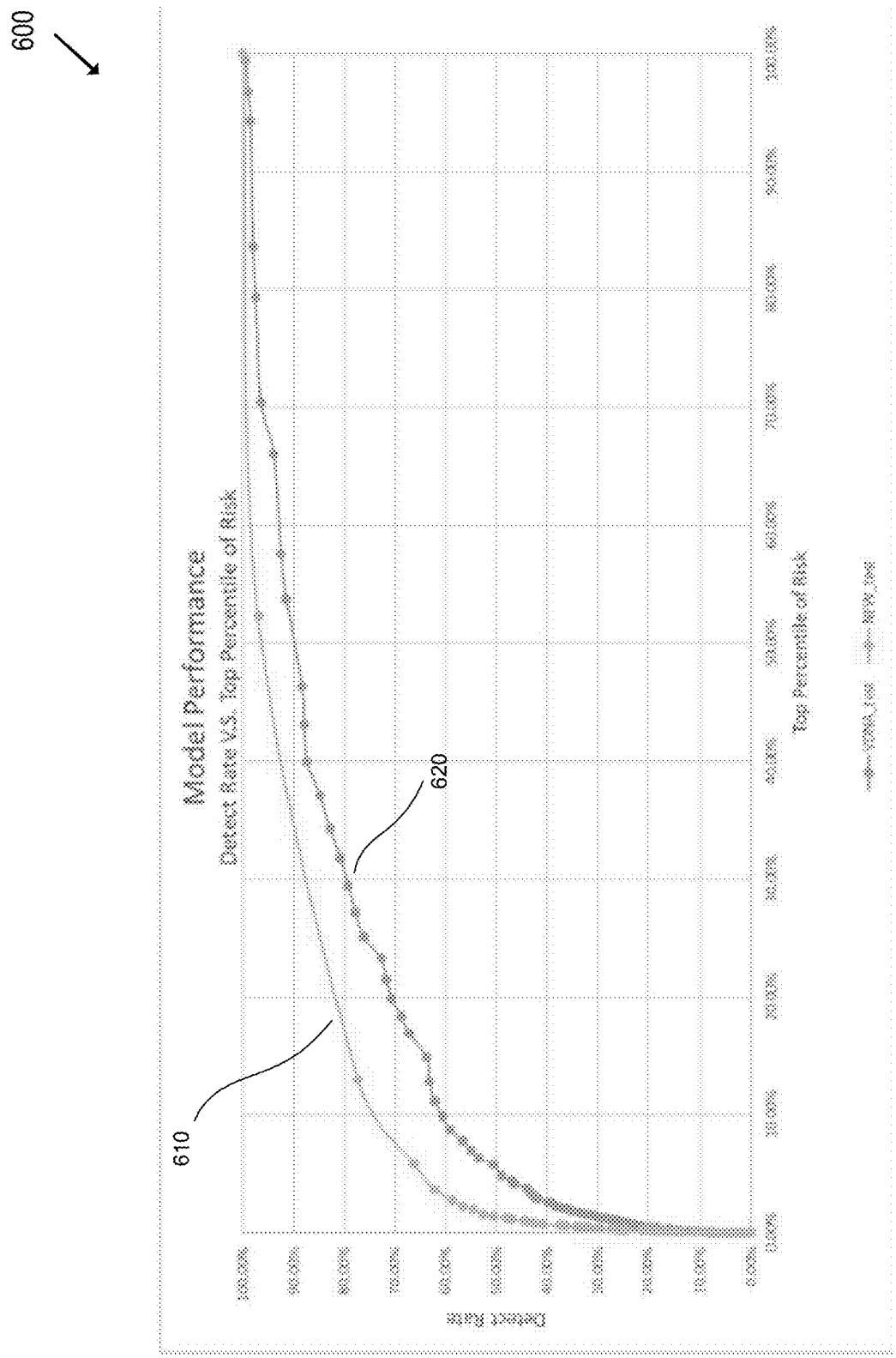
FIG. 6 shows an example of optimized rule performance, in accordance with embodiments of the present disclosure.

FIG. 6 shows an example of performance 600 of optimized rules in a trial, in accordance with embodiments of the present disclosure. In this example, the detection rate for fraudulent access requests is plotted versus a percentile of access requests ranked as riskiest. The detection rate represents a percentage of all the fraudulent access requests detected, which is a measure of the accuracy of classification. The independent variable in this example, the percentile of access requests ranked as riskiest, represents a threshold for classifying the access requests as fraudulent. For an ideal classifier, the detection rate for fraudulent access requests would rise very steeply from zero to 100% as the percentile of access requests increased from zero.

Of course, the classification results depend on the rule weights used, even holding this threshold constant. Test result 610 illustrates the percentile of access requests ranked based on rule weights optimized using the system and methods disclosed herein. For comparison, test result 620 illustrates the percentile of access requests ranked based on un-optimized rule weights.

In this example, optimized test result 610 performs significantly better at detecting fraudulent access requests than does un-optimized test result 620. Specifically, for any given percentile of riskiest access requests, optimized test result 610 provides a significantly higher detection rate than does un-optimized test result 620. For example, for a $10^{th}$ percentile of riskiest access requests, optimized test result 610 provides about 15% higher detection rate than un-optimized test result 620, and for a $20^{th}$ percentile of riskiest access requests, optimized test result 610 provides about 11% higher detection rate.

C. Other Machine Learning Techniques

In some embodiments, the system can use other types of machine learning (ML), for example neural networks, to optimize the rule weights. The system may use a single neural network, but the different rules may appear in different layers. Accordingly, at the final results, the system can consolidate the weights in different layers into one weight, such that only one weight is output for each rule. For example, for a multilayer neural network, for each rule, different layers may be written, but the system can consolidate all the weights into one. In an embodiment, the weights would be part of the ML model.

D. Adding/Removing Rules from Rule Profile

In addition to optimizing the respective rule weights for a given rule profile, in some embodiments the system optimizes the collection of rules in the rule profile by adding and/or removing rules. If a weighted sum of all the rules is used, the removal of a rule can be accomplished by setting a rule weight to 0. The system can add and/or remove rules via stepwise regression or a single process, such as using a decision tree. In some embodiments, a user can add or remove rules and repeat the optimization of rule weights. Likewise, a user can set constraints on the rules used, such as requiring certain rules to be used.

Accordingly, optimizing the weights for the rule profile can be based on stepwise regression and/or logistic regression, a neural network, one or more decision trees, or other machine learning technique. And, computing the profile score can use logistic regression, a neural network, or one or more decision trees that include the optimized weights.

1. Via Stepwise Regression

In some embodiments, the system can perform stepwise regression to add and/or remove rules from the rule profile. In stepwise regression, each prospective rule to be added or removed is considered in succession. In particular, stepwise regression can proceed by forward stepwise regression, also referred to as forward selection, or by backward stepwise regression, also referred to as backward elimination. In some cases, the stepwise regression can proceed by a combination of forward and backward stepwise regression, such as by bidirectional elimination.

In the case of forward stepwise regression, the system can consider each prospective trial rule of a plurality of trial rules in succession, and determine the improvement to the model performance if the prospective rule is added to the existing trial rule profile. If the improvement to the model performance exceeds a threshold, the system can adopt the rule, otherwise it does not adopt the rule. For example, the threshold may refer to a significance level, and the system may adopt the rule if doing so causes a statistically significant improvement in the model performance. In another example, the system may add the rule if adding it results in the most statistically significant improvement in the model performance among all the prospective rules. In a third example, the system may adopt the prospective rule if the resulting model performance improvement exceeds an absolute threshold, such as 10% or 15%. In a typical example, the system starts from an empty trial rule profile, and considers each rule in succession as a prospective added rule. However, in some examples, the system may start from an existing rule profile, such as a rule profile currently in use by a merchant or other user, or from a set of rules selected by a user. In an embodiment, the system may proceed to consider prospective rules in a random order.

In backward stepwise regression, the system can consider each rule successively, and quantify the decline in the model performance if the prospective rule is removed from the existing trial rule profile. If the decline in the model performance is less than a threshold, the system can remove the rule, otherwise the system retains the rule in the rule profile. For example, the threshold may refer to a significance level, and the system may remove the rule if doing so causes a statistically insignificant decline in the model performance. In another example, the system may remove the rule if removing it results in the least statistically significant decline in the model performance among the rules of the existing trial rule profile. In a third example, the system may remove the prospective rule if the resulting model performance decline is less than an absolute threshold. In a typical example, the system starts from a trial rule profile including all the prospective rules, and considers removing each prospective rule in succession. However, in some examples, the system may start from an existing rule profile, such as a rule profile currently in use by a merchant or other user, or from a set of rules selected by a user. In an embodiment, the system may proceed to consider prospective rules in a random order.

2. Single Process

In some embodiments, the system can use decision trees, such as random forests, with gradient boosting for a core model. Such techniques may also be referred to as gradient boosting or a Gradient Boosting Machine (GBM), and can be thought of as a network of decision trees. With a decision tree, each rule used by a user may correspond to a respective detector in the core model. A detector may be similar to a variable, or a rule without a threshold. In an embodiment, the decision tree can be used to determine a set of detectors to be optimized, corresponding to rules in a rule profile.

In particular, the decision tree can provide an evaluation of how important a respective detector is. For example, in a decision tree with gradient boosting, the same detector may appear in multiple trees because it is generated in different ways, such as via different training data, different parameters, or different seeds. Accordingly, the importance of a respective detector may be estimated based on a frequency, or number of times, the respective detector appears in different trees. The importance of a respective detector may be further based on the depths of its level in each tree and a number of access requests. In this way, the decision tree can provide a set of importance indices for each detector. A user can then choose some number of the most important detectors, depending how many rules the user wants and an appropriate tolerance level for the application.

IV. Methods

Disclosed herein are methods to optimize weights for rule profiles. Specifically, the system can determine optimal values of the weights so as to optimize a cost function (e.g., by maximizing the classification accuracy). Determining the optimal weights may be equivalent to searching the parameter space of rule weights for the point (or a set of points) at which a cost function is optimized. Thus, the determined optimal weights may provide substantially, or approximately, optimal classification for a given set of rules.

A. Method for Optimizing Rule Weights

Figure 7:
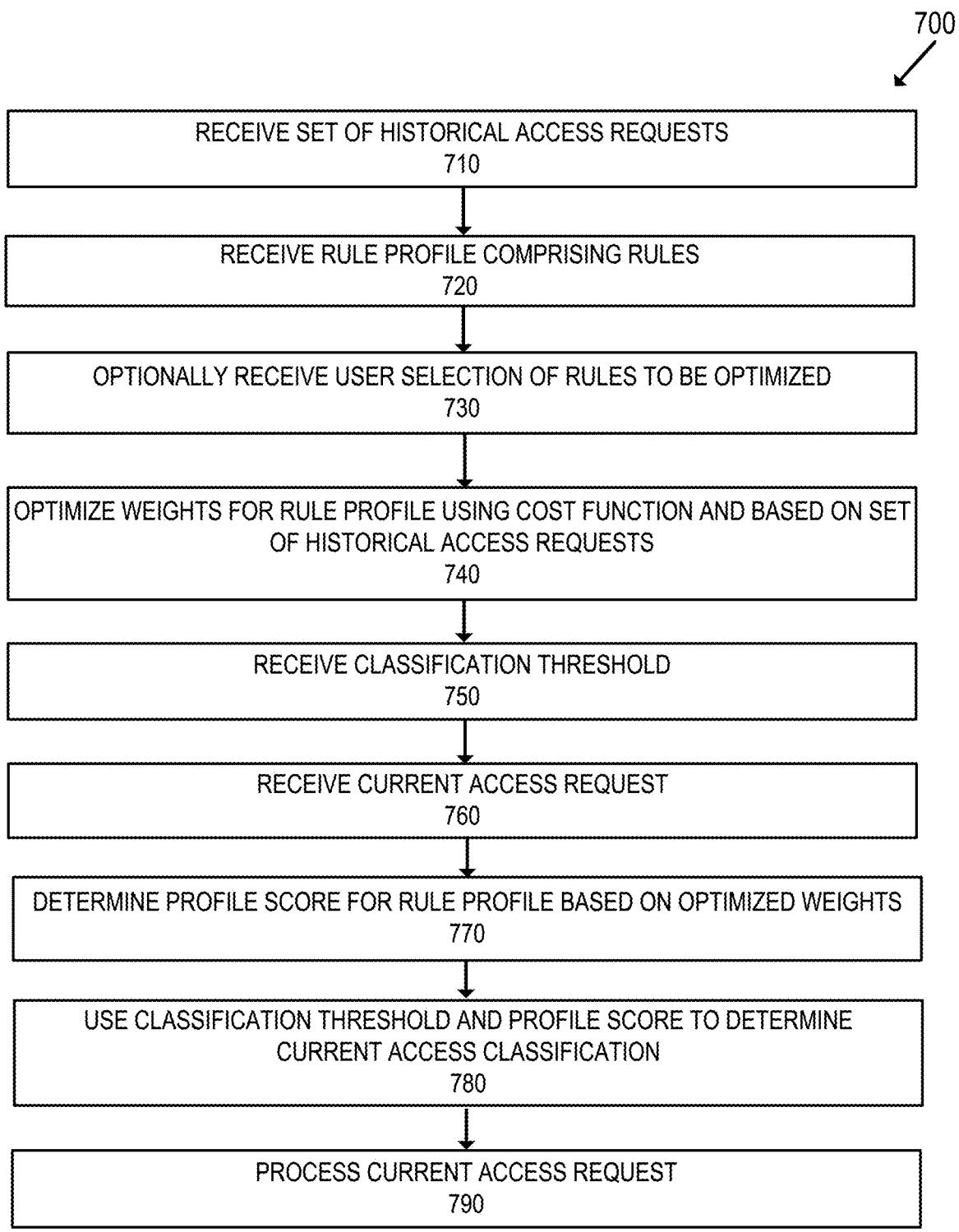
FIG. 7 is a flow diagram of a method for optimizing weights for a rule profile, in accordance with embodiments of the present disclosure.

FIG. 7 is a flow diagram of a method 700 for optimizing weights for a rule profile, in accordance with embodiments of the present disclosure. Method 700 may be performed in a system such as central server 12 of the example of FIG. 1 or the computer system of the example of FIG. 10.

At step 710, the system can receive a set of historical access requests for a set of resources. Each of the set of historical access requests may comprise access data identifying a resource of the set of resources and including requestor information of a requesting entity and an outcome label regarding validity of the access request. The system can use the historical access data as a training set for optimizing the weights in the rule profile.

At step 720, the system can receive a rule profile comprising rules. The rules can be triggerable by characteristics of access requests, for example in the access data. The rule profile defines a profile score based on weights of rules that are triggered for an access request. The rule profile can specify access classifications of providing access to the set of resources managed by a resource computer based on the profile score. In various embodiments, the rules in the rule profile may be obtained from a rule suggestion engine, be part of a core model, be selected by a user, or be selected by the system.

At step 730, the system optionally can receive a user selection of rules to be optimized. The rules can be received via any suitable interface, e.g., a graphical user interface or via an application programming interface.

At step 740, the system can optimize weights for a rule profile using a cost function and based on the training set of historical access requests. A respective optimized weight may have a positive or negative sign. The cost function can include the access classifications of the set of historical access requests obtained using the weights. The cost function can further include penalties for false positive classifications and false negative classifications relative to the outcome labels. For example, the cost function may be proportional to the area under a Receiver Operating Characteristic (ROC) curve in ROC analysis, which in turn may be proportional to the probability of a classifier correctly ranking two randomly chosen access requests relative to each other. In various embodiments, optimizing the weights for the rule profile is based on stepwise regression, logistic regression, neural networks, decision trees with gradient boosting, and/or another machine learning method.

At step 750, the system can optionally receive one or more classification thresholds for the rule profile from the resource computer. The classification threshold(s) can be received via any suitable interface, e.g., a graphical user interface or via an application programming interface. In some embodiments, the system can select an optimal threshold, e.g., one that maximizes a sum of true positives and true negatives, or provides a lowest number of false positives and false negatives. A classification threshold can be used to determine which access request outcome applies, e.g., by discriminating between different access request outcomes for different profile scores.

At step 760, the system can receive a current access request. The current access request can include new access data identifying a current resource and including current requestor information of a current requesting entity. In various embodiments, the request can be received from a request computer (which may be an access device or the same as the resource computer) or a user device.

At step 770, the system can compute a profile score for the rule profile based on the optimized weights. In some embodiments, computing the profile score involves summing a respective value of a respective weight of the optimized weights for a respective rule that is triggered in the rule profile by the current access request. Alternatively, computing the profile score can use a neural network or decision trees that include the optimized weights.

At step 780, the system can use the one or more classification thresholds and the current profile score to determine the current access classification for providing access to the current resource. For example, the current profile score can be compared to a threshold to determine a classification (e.g., if the profile score is higher than a threshold, then the classification can be to "reject" the access request. As another example, the profile score and threshold can be parameters in a machine learning model or be an intermediate result of the machine learning model (e.g., logistic regression). Example classifications are provided herein and are also referred to as access request outcomes. Other criteria may also be used to determine the classification.

At step 790, the system can process the current access request in accordance with the current access classification to provide a specified access to the current resource. For example, with respect to FIG. 1A, access server 120 can provide instructions to resource computer 110 to allow access to the resource, e.g., electronic resource 116.

Steps 710-750 may be repeated at any time, e.g., via a user interface that provides the ability to build and configure rule profiles and profile scores. When a user determines to update a profile score, the user can user the interface, e.g., to click and choose the configurable parameters, such as one or more of: historic data time frame, pool of rules (potentially specifying required rules and optional rules), number of final rules, optimizing machine techniques to use, testing data time frame, etc. Then, the automation and optimization process can run, and the final results can be delivered to a user, including which rules/elements stay in the final model, the performance charts, and statistics comparing to existing testing data.

B. Methods for Adding and Deleting Rules

Figure 8:
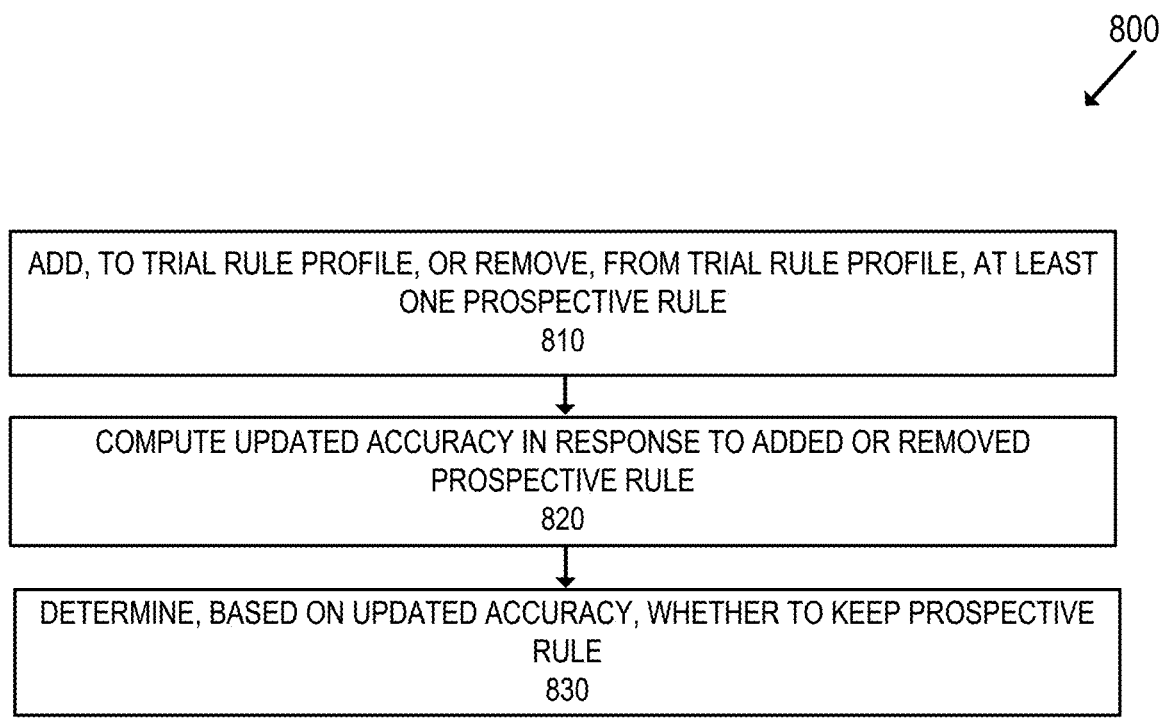
FIG. 8 is a flow diagram of a method for adding and deleting rules based on stepwise regression, in accordance with embodiments of the present disclosure.

FIG. 8 is a flow diagram of a method 800 for adding and deleting rules based on stepwise regression, in accordance with embodiments of the present disclosure. The system may add rules via forward regression or remove rules via backward regression. This process can occur using stepwise regression. In some embodiments, the system can perform a mixture of both, for example, by removing a first rule and adding a second rule, and is not limited by the present disclosure.

At step 810, the system can add, to a trial rule profile, or remove, from the trial rule profile, at least one prospective rule. In a typical example of forward regression, the system starts from an empty trial rule profile, and considers each rule in succession as a prospective added rule. Likewise, in a typical example of backward regression, the system starts from a trial rule profile including all the prospective rules, and considers removing each prospective rule in succession. However, in some examples, the system may start from an existing rule profile, such as a rule profile currently in use by a merchant or other user.

At step 820, the system can compute an updated accuracy in response to the added or removed prospective rule. The accuracy measurement can use metrics described herein, e.g., the cost function, which may include an AUC of a ROC curve.

At step 830, the system can determine, based on the updated accuracy, whether to keep the prospective rule. In the case of forward regression, if the improvement to the model performance exceeds a threshold, the system can adopt the rule, otherwise it does not adopt the rule. For example, the threshold may refer to a significance level, and the system may adopt the rule if doing so causes a statistically significant improvement in the model performance. In another example, the system may add the rule if adding it results in the most statistically significant improvement in the model performance among all the prospective rules. In a third example, the system may adopt the prospective rule if the resulting model performance improvement exceeds an absolute threshold, such as 10% or 15%.

Likewise, in the case of backward regression, if the decline in the model performance is less than a threshold, the system can remove the rule, otherwise the system retains the rule in the rule profile. For example, the threshold may refer to a significance level, and the system may remove the rule if doing so causes a statistically insignificant decline in the model performance. In another example, the system may remove the rule if removing it results in the least statistically significant decline in the model performance among the rules of the existing trial rule profile. In a third example, the system may remove the prospective rule if the resulting model performance decline is less than an absolute threshold.

Figure 9:
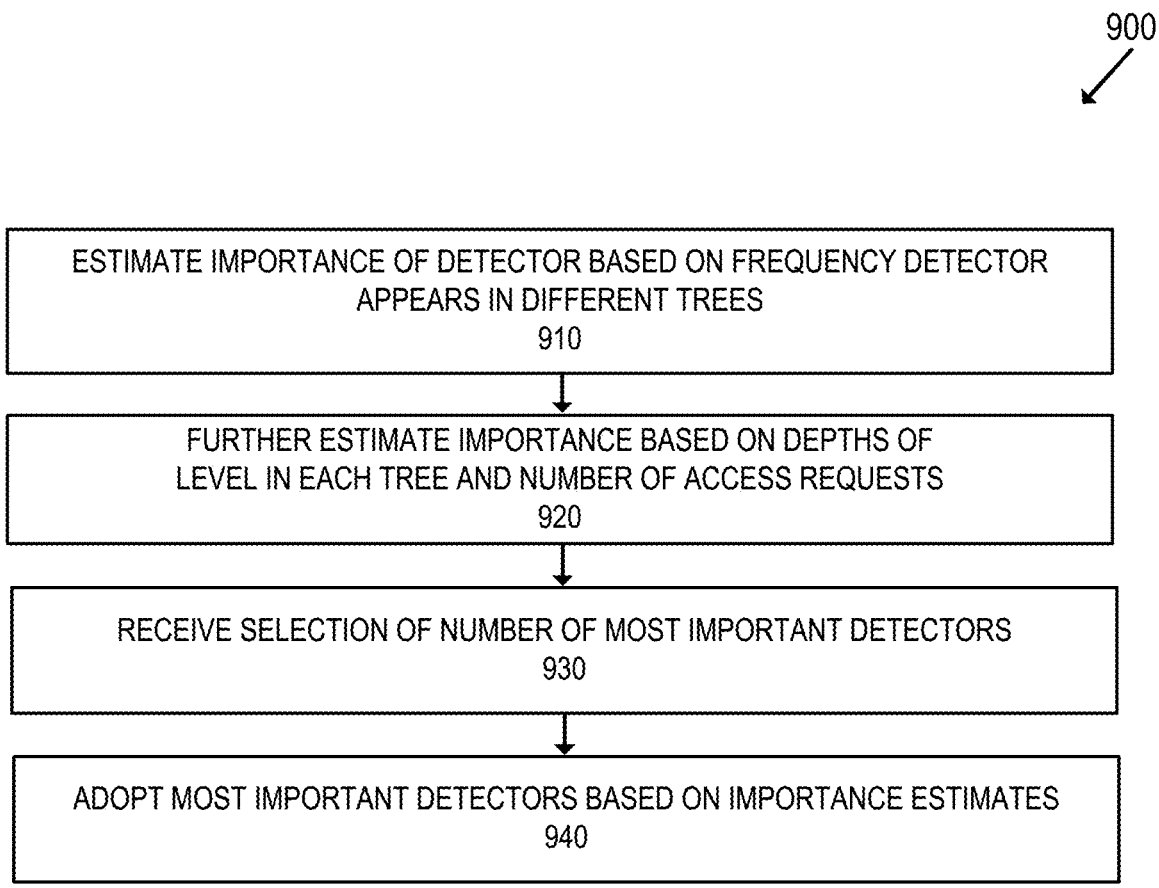
FIG. 9 is a flow diagram of a method for adding and deleting rules based on a decision tree, in accordance with embodiments of the present disclosure.

FIG. 9 is a flow diagram of a method 900 for adding and deleting rules based on decision trees with gradient boosting, in accordance with embodiments of the present disclosure.

At step 910, the system can use the decision trees to estimate the importance of a respective detector (a rule) based on a frequency the respective detector appears in different trees. In an example, the frequency may refer to a number of times the rule is triggered. For example, in a decision tree with gradient boosting, the same detector may appear in multiple trees because it is generated in different ways, such as via different training data, different parameters, or different seeds.

At step 920, the system can use the decision trees to further estimate the importance of the respective detector based on the depths of its level in each tree and a number of access requests. In this way, the decision tree can provide a set of importance indices for each detector.

At step 930, the system can receive a selection of a number N of the most important detectors. For example, the system can receive the selection from a user interface. The number N may be specified and the top N detectors may be selected.

At step 940, the system can adopt the number N of detectors based on the importance estimates. These rules can then be used in a next round of optimizing the weights and the result for N rules can be compared to other optimizations with other numbers of rules (e.g., N−1 or N+1).

V. Computer Apparatus

Figure 10:
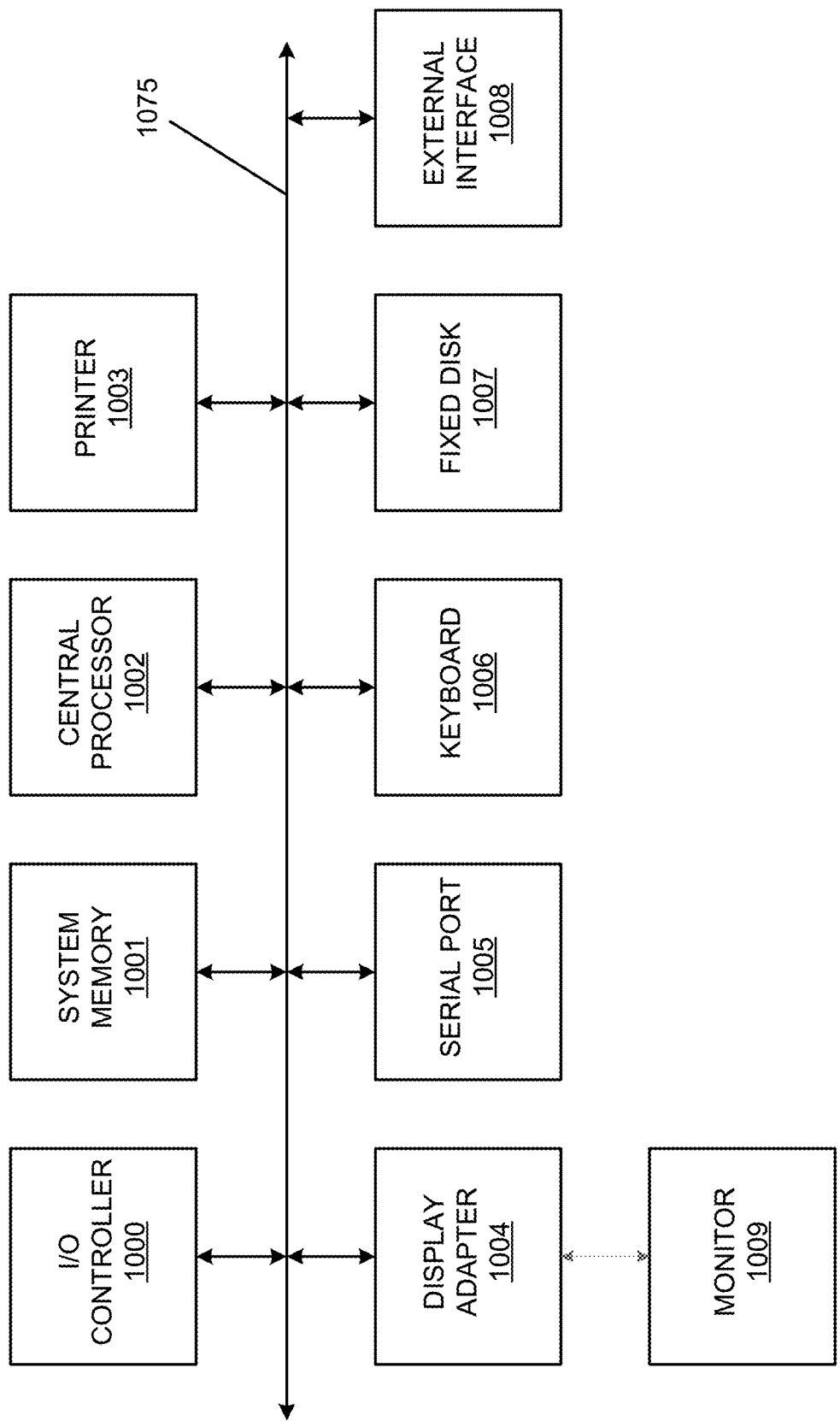
FIG. 10 is a high level block diagram of a computer system that may be used to implement any of the entities or components described above.

FIG. 10 is a high level block diagram of a computer system that may be used to implement any of the entities or components described above. The subsystems shown in FIG. 10 are interconnected via a system bus 1075. Additional subsystems include a printer 1003, keyboard 1006, fixed disk 1007, and monitor 1009, which is coupled to display adapter 1004. Peripherals and input/output (I/O) devices, which couple to I/O controller 1000, can be connected to the computer system by any number of means known in the art, such as a serial port. For example, serial port 1005 or external interface 1008 can be used to connect the computer apparatus to a wide area network such as the Internet, a mouse input device, or a scanner. The interconnection via system bus 1075 allows the central processor 1002 to communicate with each subsystem and to control the execution of instructions from system memory 1001 or the fixed disk 1007, as well as the exchange of information between subsystems. The system memory 1001 and/or the fixed disk may embody a computer-readable medium.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method of configuring an access system for providing access to a resource, the method comprising, performing by the access system:
   receiving a set of historical access requests for a set of resources, each of the set of historical access requests comprising access data identifying the resource of the set of resources and including requestor information of a requesting entity and an outcome label regarding a validity of a historical access request;
   receiving a rule profile comprising rules that are triggerable by the access data, the rule profile defining a profile score based on weights of rules that are triggered for an access request and specifying access classifications of providing access to the set of resources managed by a resource computer based on the profile score;
   optimizing, using the set of historical access requests, the weights for the rules of the rule profile using a cost function that includes the access classifications of the set of historical access requests obtained using the weights, the cost function including penalties for false positive classifications and false negative classifications relative to the outcome labels;
   receiving a current access request including new access data identifying a current resource and including current requestor information of a current requesting entity;
   computing a current profile score for the rule profile based on the optimized weights;
   obtaining one or more classification thresholds for discriminating between different access request outcomes;
   using one or more classification thresholds and the current profile score to determine a current access classification for providing access to the current resource;
   processing the current access request in accordance with the current access classification to provide a specified access to the current resource;
   adding, to the rules, or removing, from the rules, at least one trial rule;
   computing an updated accuracy in response to the adding or removing; and
   determining, based on the updated accuracy, whether to keep the at least one trial rule.

2. The method of claim 1, wherein the one or more classification thresholds for the rule profile are received from the resource computer.

3. The method of claim 1, wherein optimizing the weights for the rule profile is based on stepwise regression and/or logistic regression, a neural network, one or more decision trees, or other machine learning technique.

4. The method of claim 1, further comprising receiving a user selection of the rules to be optimized.

5. The method of claim 1, further comprising considering a plurality of trial rules in succession.

6. The method of claim 1, wherein determining whether to keep the at least one trial rule further comprises comparing the updated accuracy against a threshold.

7. The method of claim 1, wherein computing the profile score uses logistic regression, a neural network, or one or more decision trees that include the optimized weights.

8. The method of claim 1, wherein the cost function is used to obtain the one or more classification thresholds after optimizing an area under a curve in a Receiver Operating Characteristic (ROC) analysis.

9. The method of claim 1, wherein computing the profile score further comprises summing a respective value of a respective weight of the optimized weights for a respective rule that is triggered.

10. An access system for providing access to a resource, the access system comprising:
    a processor, and
    a non-transitory computer-readable medium coupled to the processor, the non-transitory computer-readable medium comprising code executable by the processor to perform a method comprising:
       receiving a set of historical access requests for a set of resources, each of the set of historical access requests comprising access data identifying the resource of the set of resources and including requestor information of a requesting entity and an outcome label regarding a validity of a historical access request;
       receiving a rule profile comprising rules that are triggerable by the access data, the rule profile defining a profile score based on weights of rules that are triggered for an access request and specifying access classifications of providing access to the set of resources managed by a resource computer based on the profile score;
       optimizing, using the set of historical access requests, the weights for the rules of the rule profile using a cost function that includes the access classifications of the set of historical access requests obtained using the weights, the cost function including penalties for false positive classifications and false negative classifications relative to the outcome labels;

receiving a current access request including new access data identifying a current resource and including current requestor information of a current requesting entity;

computing a current profile score for the rule profile based on the optimized weights;

obtaining one or more classification thresholds for discriminating between different access request outcomes;

using one or more classification thresholds and the current profile score to determine a current access classification for providing access to the current resource;

processing the current access request in accordance with the current access classification to provide a specified access to the current resource;

adding, to the rules, or removing, from the rules, at least one trial rule;

computing an updated accuracy in response to the adding or removing; and determining, based on the updated accuracy, whether to keep the at least one trial rule.

11. The access system of claim 10, wherein optimizing the weights for the rule profile is based on stepwise regression and/or logistic regression, a neural network, one or more decision trees, or other machine learning technique.

12. The access system of claim 10, wherein the method further comprises considering a plurality of trial rules in succession.

13. The access system of claim 10, wherein determining whether to keep the at least one trial rule further comprises comparing the updated accuracy against a threshold.

14. The access system of claim 10 wherein computing the profile score uses logistic regression, a neural network, or one or more decision trees that include the optimized weights.

15. The access system of claim 10, wherein the cost function is used to obtain the one or more classification thresholds after optimizing an area under a curve in a Receiver Operating Characteristic (ROC) analysis.

16. The access system of claim 10, wherein computing the profile score further comprises summing a respective value of a respective weight of the optimized weights for a respective rule that is triggered.

* * * * *